(12) United States Patent
Dye et al.

(10) Patent No.: US 7,677,030 B2
(45) Date of Patent: Mar. 16, 2010

(54) APPARATUS, SYSTEM, AND METHOD FOR DETERMINING A REGENERATION AVAILABILITY PROFILE

(75) Inventors: Melissa Dye, Columbus, IN (US); J. Steve Wills, Columbus, IN (US)

(73) Assignee: Cummins, Inc., Minneapolis, MN (US)

( * ) Notice: Subject to any disclaimer, the term of this patent is extended or adjusted under 35 U.S.C. 154(b) by 186 days.

(21) Appl. No.: 11/301,808

(22) Filed: Dec. 13, 2005

(65) Prior Publication Data
US 2007/0130922 A1   Jun. 14, 2007

(51) Int. Cl.
*F01N 3/00* (2006.01)

(52) U.S. Cl. .............................. 60/295; 60/276; 60/297; 60/301; 60/311

(58) Field of Classification Search .................. 60/276, 60/295, 297, 301, 303, 311
See application file for complete search history.

(56) References Cited

U.S. PATENT DOCUMENTS

| | | | |
|---|---|---|---|
| 4,651,524 A | 3/1987 | Brighton | |
| 6,405,528 B1 | 6/2002 | Christen et al. | |
| 6,662,480 B1 | 9/2002 | Tashiro et al. | |
| 6,634,170 B2 | 10/2003 | Hiranuma et al. | |
| 6,666,020 B2 | 12/2003 | Tonetti et al. | |
| 6,735,941 B2 | 5/2004 | Saito et al. | |
| 6,756,904 B2 | 6/2004 | Kinugawa et al. | |
| 6,758,039 B2 | 7/2004 | Kuboshima et al. | |
| 6,805,095 B2 | 10/2004 | Sun et al. | |
| 6,820,418 B2 | 11/2004 | Nakatani et al. | |
| 6,829,889 B2 | 12/2004 | Saito et al. | |
| 6,829,890 B2 | 12/2004 | Gui et al. | |
| 6,851,258 B2 | 2/2005 | Kawashima et al. | |
| 6,854,265 B2 | 2/2005 | Saito et al. | |
| 6,862,927 B2 | 3/2005 | Craig et al. | |
| 6,865,885 B2 | 3/2005 | Kitahara | |
| 6,907,873 B2 | 6/2005 | Hamahata | |
| 6,928,809 B2 | 8/2005 | Inoue et al. | |
| 6,941,750 B2 | 9/2005 | Boretto et al. | |
| 6,951,100 B2 | 10/2005 | Kuboshima et al. | |
| 6,966,178 B2 | 11/2005 | Saito et al. | |
| 6,969,413 B2 * | 11/2005 | Yahata et al. | 55/282.3 |
| 6,983,591 B2 | 1/2006 | Kondo et al. | |
| 7,000,384 B2 * | 2/2006 | Kagenishi | 60/295 |
| 7,054,734 B2 | 5/2006 | Todoroki et al. | |
| 7,069,721 B2 | 7/2006 | Gotou | |

(Continued)

FOREIGN PATENT DOCUMENTS

EP   1568865 A1   8/2005

*Primary Examiner*—Thomas E Denion
*Assistant Examiner*—Diem Tran
(74) *Attorney, Agent, or Firm*—Kunzler Needham Massey & Thorpe

(57) ABSTRACT

An apparatus, system, and method are disclosed for determining a regeneration availability profile for an exhaust gas aftertreatment system. The apparatus, in one embodiment, is configured to determine whether required regeneration conditions could be met within the system if attempted. The apparatus may include a data module for storing and retrieving a regeneration availability profile and for receiving regeneration requirements data. The apparatus may further include an input module for receiving input relative to current operating conditions of the exhaust gas aftertreatment system. The apparatus may further include a controller which uses the required regeneration conditions, the retrieved regeneration availability profile, and the input relative to current operating conditions to produce and store a new regeneration availability profile.

25 Claims, 8 Drawing Sheets

U.S. PATENT DOCUMENTS

| | | | |
|---|---|---|---|
| 7,107,760 | B2 | 9/2006 | Shirakawa |
| 7,111,455 | B2 | 9/2006 | Okugawa et al. |
| 7,137,247 | B2 | 11/2006 | Koga et al. |
| 7,147,693 | B2 | 12/2006 | Inoue et al. |
| 7,162,867 | B2 | 1/2007 | Saito et al. |
| 7,169,364 | B2 | 1/2007 | Ohtake et al. |
| 7,208,029 | B2 | 4/2007 | Shirakawa et al. |
| 7,231,291 | B2 | 6/2007 | Dollmeyer et al. |
| 7,254,940 | B2 | 8/2007 | Saitoh et al. |
| 7,264,642 | B2 | 9/2007 | Hamahata et al. |
| 7,275,365 | B2 | 10/2007 | Zhan et al. |
| 2002/0112472 | A1 | 8/2002 | Tashiro et al. |
| 2002/0196153 | A1 | 12/2002 | Kinugawa et al. |
| 2003/0167757 | A1 | 9/2003 | Boretto et al. |
| 2003/0200742 | A1* | 10/2003 | Smaling .................... 60/275 |
| 2003/0230079 | A1 | 12/2003 | Kuboshima et al. |
| 2004/0103654 | A1* | 6/2004 | Ohtake et al. ............... 60/295 |
| 2004/0159098 | A1 | 8/2004 | Gui et al. |
| 2004/0159099 | A1 | 8/2004 | Kuboshima et al. |
| 2004/0172933 | A1 | 9/2004 | Saito et al. |
| 2004/0194453 | A1 | 10/2004 | Koga et al. |
| 2004/0200271 | A1 | 10/2004 | van Nieuwstadt |
| 2004/0204818 | A1 | 10/2004 | Trudell et al. |
| 2005/0022519 | A1 | 2/2005 | Shirakawa |
| 2005/0022520 | A1 | 2/2005 | Shirakawa et al. |
| 2005/0044846 | A1 | 3/2005 | Yahata et al. |
| 2006/0277898 | A1* | 12/2006 | McCarthy .................... 60/286 |
| 2007/0006577 | A1 | 1/2007 | Yokoyama et al. |

* cited by examiner

| Operating period | Length of time value | Regeneration opportunity tally values |
|---|---|---|
| 1 | 8 seconds | V11 |
| 1 | 20 seconds | V21 |
| 1 | 60 seconds | V31 |
| 1 | 170 seconds | V41 |
| 1 | 500 seconds | V51 |
| 1 | 1500 seconds | V61 |
| 2 | 8 seconds | V12 |
| 2 | 20 seconds | V22 |
| 2 | 60 seconds | V32 |
| 2 | 170 seconds | V42 |
| 2 | 500 seconds | V52 |
| 2 | 1500 seconds | V62 |
| 3 | 8 seconds | V13 |
| 3 | 20 seconds | V23 |
| 3 | 60 seconds | V33 |
| 3 | 170 seconds | V43 |
| 3 | 500 seconds | V53 |
| 3 | 1500 seconds | V63 |
| 4 | 8 seconds | V14 |
| 4 | 20 seconds | V24 |
| 4 | 60 seconds | V34 |
| 4 | 170 seconds | V44 |
| 4 | 500 seconds | V54 |
| 4 | 1500 seconds | V64 |

Fig. 4

| OP | Length of time value | Regeneration opportunity tally values | Weighting Coefficient | Tally Products = Tally * Coefficient |
|---|---|---|---|---|
| 1 | 8 | 135 | 0 | 0 |
| 1 | 20 | 41 | 0 | 0 |
| 1 | 60 | 8 | 3 | 24 |
| 1 | 170 | 3 | 14 | 42 |
| 1 | 500 | 1 | 47 | 47 |
| 1 | 1500 | 2 | 147 | 294 |
| 2 | 8 | 105 | 0 | 0 |
| 2 | 20 | 55 | 0 | 0 |
| 2 | 60 | 6 | 2 | 12 |
| 2 | 170 | 6 | 9.3 | 55.8 |
| 2 | 500 | 0 | 31.3 | 0 |
| 2 | 1500 | 1 | 98 | 98 |
| 3 | 8 | 170 | 0 | 0 |
| 3 | 20 | 30 | 0 | 0 |
| 3 | 60 | 10 | 1.3 | 13 |
| 3 | 170 | 2 | 6.2 | 12.4 |
| 3 | 500 | 3 | 20.9 | 62.7 |
| 3 | 1500 | 0 | 65.3 | 0 |
| 4 | 8 | 88 | 0 | 0 |
| 4 | 20 | 47 | 0 | 0 |
| 4 | 60 | 6 | 0.9 | 5.4 |
| 4 | 170 | 8 | 4.1 | 32.8 |
| 4 | 500 | 1 | 13.9 | 13.9 |
| 4 | 1500 | 1 | 43.5 | 43.5 |
| | | | Regeneration Opportunity Value | 756.5 |

APPARATUS, SYSTEM, AND METHOD FOR DETERMINING A REGENERATION AVAILABILITY PROFILE

FIELD OF THE INVENTION

This invention relates to exhaust gas after-treatment systems and more particularly relates to apparatus, systems and methods for defining a regeneration availability profile.

DESCRIPTION OF THE RELATED ART

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, accumulated particulate matter is commonly oxidized and removed in a controlled regeneration process before excessive levels have accumulated. To oxidize the accumulated particulate matter, exhaust temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to initiate oxidation of particulate buildup and to increase the temperature of the filter. A filter regeneration event occurs when substantial amounts of soot are consumed on the particulate filter. Partial or complete regeneration may occur depending on the duration of time the filter is exposed to elevated temperatures and the amount of particulate matter remaining on the filter. Partial regeneration can contribute to irregular distribution of particulate matter across the substrate of a particulate filter.

Controlled regeneration traditionally has been gauged by set intervals, such as distance traveled or time passed. Interval based regeneration, however, has proven to be inadequate for several reasons. First, regenerating a particulate filter with little or no particulate buildup lessens the fuel economy of the engine and exposes the particulate filter to unnecessary high temperature cycles. Second, if particulate matter accumulates excessively before the next regeneration, backpressure from blockage of the exhaust flow can negatively affect engine performance. In addition, regeneration with excessive levels of particulates present can potentially cause filter failure or the like. Consequently, particulate filters regenerated on a set interval must be replaced frequently to maintain the integrity of an exhaust gas after-treatment system.

Aftertreatment systems must generally be produced with no knowledge of the specific final application for each system. The final application affects the regeneration opportunities available to the aftertreatment system. For example, some systems will be installed in applications that haul heavy loads for long distances, and the aftertreatment system can achieve a controlled regeneration whenever desired because it is always easy to generate temperature in the exhaust stream. Some systems will be installed in applications like a lightly loaded stop and go delivery vehicle, and the aftertreatment system can only achieve short periods of temperature generation.

The aftertreatment system cannot be produced with the final application specifically known, and even if the aftertreatment system can know the initial application after the first sale of the system, the subsequent applications of the system cannot be known because the initial user is not generally restricted from selling or changing the usage of the device on which the aftertreatment system is installed. Without a way to determine the final application while the aftertreatment system is in use, the aftertreatment system must be built for the extremes of the possible applications. This means that either all of the aftertreatment systems will be produced to handle the worst regeneration opportunity situations, and therefore the systems will have lower fuel economy than otherwise possible, or the designer will have to accept a relatively higher level of risk for those systems that have fewer regeneration opportunities than the aftertreatment systems are designed for, and thus a number of particulate filters will overload with soot and be subjected to an uncontrolled regeneration event.

If a controller could know the application usage profile, then the controller could take mitigating actions to make successful regeneration more likely in a given application. For example, if the controller knew the application was a stop and go, lightly loaded application, the controller could take advantage of every available regeneration opportunity, regardless of whether the "standard" control setup would require a regeneration each time. Likewise, in a heavy hauling application, the controller could allow the particulate filter to fill up each time, knowing that when regeneration is attempted it will succeed, and therefore maximize the fuel economy and minimize the number of thermal cycles, and thus thermal fatigue, on the components of the aftertreatment system. Ideally, the controller would be able to know the general application usage, so the controller could use the best overall strategy for that usage, and the controller would also be able to know that something specific is happening currently that may be different than the general application usage, to allow the controller to use an event specific strategy for that situation.

From the foregoing discussion, it should be apparent that a need exists for an apparatus, system, and method for detecting and evaluating the regeneration opportunities available to a specific application in the field, which can be termed a regeneration availability profile. Beneficially, such an apparatus, system, and method provide the aftertreatment system with the overall profile of regeneration opportunities, as well as provide information to allow a controller to recognize abnormal events within the overall profile. Thus, the apparatus, system, and method would enable tailoring of regeneration controls to specific applications, and therefore increase the fuel economy and reduce the uncontrolled regeneration events for aftertreatment systems.

SUMMARY OF THE INVENTION

The present invention has been developed in response to the present state of the art, and in particular, in response to the problems and needs in the art that have not yet been fully solved by currently available exhaust gas after-treatment systems requiring particulate filter regeneration. Accordingly, the present invention has been developed to provide an apparatus, system, and method to determine a regeneration availability profile that overcomes many or all of the above-discussed shortcomings in the art.

In one aspect of the invention, an apparatus for calculating a regeneration availability profile includes a data module configured to read and store regeneration availability profiles and to read regeneration requirements for an exhaust gas aftertreatment system, an input module configured to receive the current operating conditions of the exhaust gas aftertreatment system, and a controller to determine a new regeneration availability profile based upon the current operating conditions and the regeneration availability profile from the previous controller execution.

In a further aspect of the invention, the exhaust gas aftertreatment system includes a particulate filter configured to remove particulates from the exhaust stream, and a data module reads the required temperature to regenerate the particulate filter. In another embodiment of the invention, the exhaust gas aftertreatment system includes a $NO_x$ adsorber catalytic component, and a data module reads the required temperature, oxygen fraction, and exhaust gas hydrocarbon fraction required to regenerate the $NO_x$ adsorber catalytic component. In another aspect of the invention, the exhaust gas aftertreatment system includes an auxiliary device to regenerate an exhaust gas aftertreatment system, in one embodiment a hydrocarbon injector and a diesel oxidation catalyst, and the data module reads the temperature required at the diesel oxidation catalyst to burn injected hydrocarbons and achieve regeneration of some other exhaust gas aftertreatment system component.

In a further aspect of the invention, a method comprises receiving requirements data regarding conditions required to regenerate an exhaust gas aftertreatment system, reading current operating conditions, reading a stored regeneration availability profile, computing a new regeneration availability profile from the required conditions and the current conditions, and storing the new regeneration availability profile. The method may divide the regeneration availability profile into a series of operating periods, and each operating period may correspond to the typical length of a driving day. The method store a series of several operating periods in the regeneration availability profile, and then use the data within the profile to set an application regeneration difficulty label.

In one aspect of the invention, the method sets a regeneration opportunity indicator to TRUE when the current operating conditions meet the required conditions. The method may time the events where the regeneration opportunity indicator is TRUE, and may store the occurrence of the event within the regeneration availability profile.

In a further aspect of the invention, an exhaust aftertreatment system comprises a component requiring intermittent regenerations, where each regeneration requires that certain system conditions be present. The system may further include a detector, which might be sensors or parameters calculated in a controller, which detects the conditions of the exhaust aftertreatment system relative to the required system conditions. In one embodiment, the system further includes a controller to determine a regeneration availability profile using the required system conditions and the detected system conditions. The exhaust gas aftertreatment system may further include an internal combustion engine producing exhaust gas as a byproduct of normal operation.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a table illustrating one embodiment of regeneration availability profile in accordance with the present invention;

FIG. 6 is a table illustrating one embodiment of a regeneration availability profile in accordance with the present invention;

DETAILED DESCRIPTION OF THE INVENTION

Figure 1:
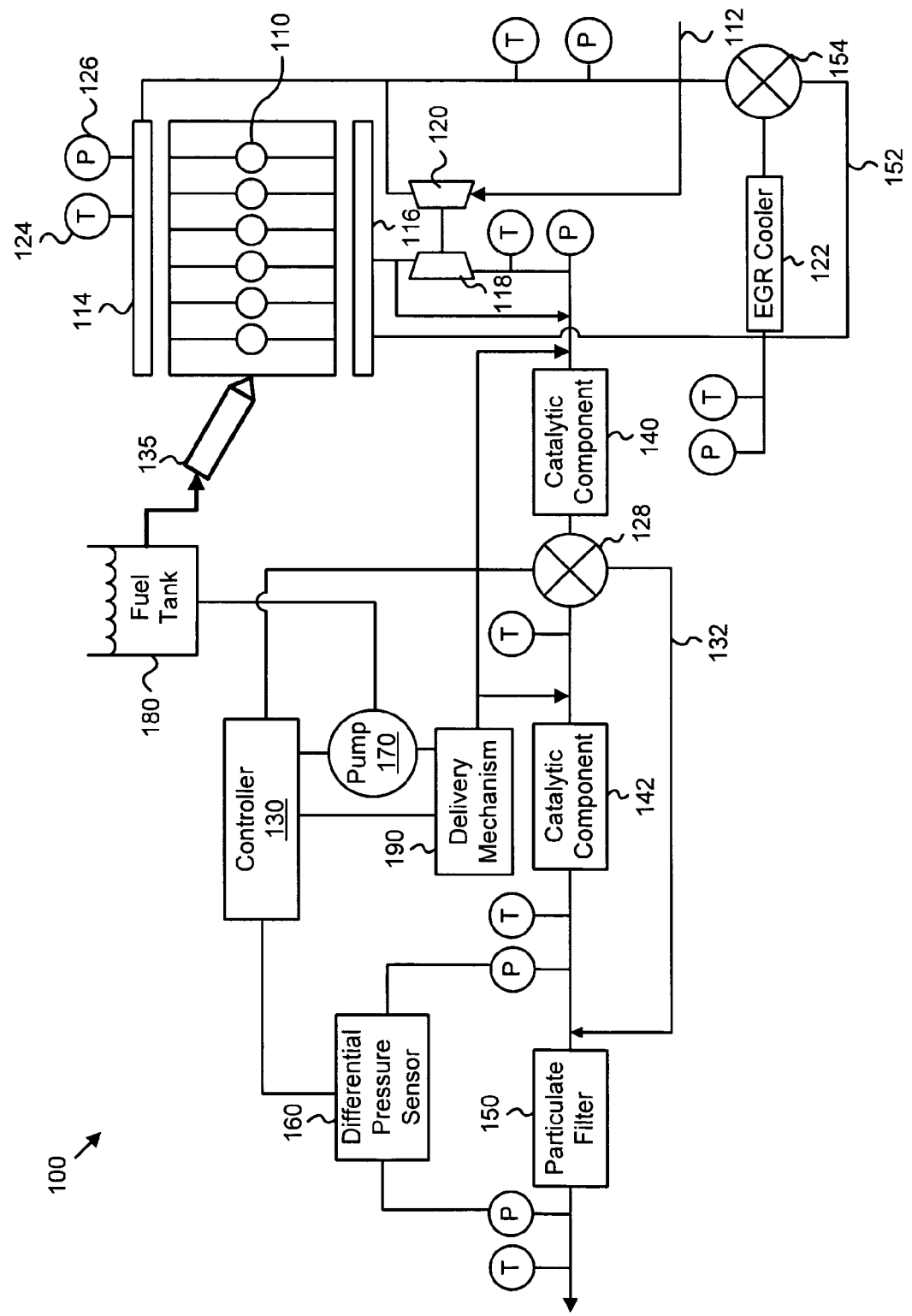
FIG. 1 is a schematic block diagram illustrating one embodiment of an exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas aftertreatment system 100, in accordance with the present invention. As illustrated, the exhaust gas aftertreatment system 100 may include a diesel engine 110, a controller 130, fuel injectors 135, a first catalytic component 140, a second catalytic component 142, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, various temperature sensors 124, and various pressure sensors 126. In one embodiment, an air inlet 112 vented to the atmosphere enables air to enter the engine system 100. The air inlet 112 may be connected to an inlet of the intake manifold 114. The intake manifold 114 includes an outlet operatively coupled to the combustion chambers of the engine 110. Within the engine 110, compressed air from the atmosphere is combined with fuel from the injectors 135 to power the engine 110, which comprises operation of the engine 110. The fuel comes from the fuel tank 180 through a fuel delivery system including, in one embodiment, a fuel pump and common rail (not shown) to the fuel injectors 135, which inject fuel into the combustion chambers of the engine 110. The timing of the fuel injection is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140, 142, the catalytic components, in one embodiment, configured to further reduce the number of pollutants and to assist in oxidizing added hydrocarbons to generate temperature. For example, in one embodiment, catalytic component 140 comprises a diesel oxidation catalyst configured to oxidize hydrocarbons in the exhaust gas, while component 142 comprises a $NO_x$ adsorber configured to capture NO and $NO_2$ from the exhaust gas, and convert it to $N_2$ upon later release during a regeneration event.

A differential pressure sensor 160 is used, in one embodiment, to determine the amount of particulate matter accumulated on the particulate filter. A fuel delivery mechanism 190 is used to add hydrocarbons to the exhaust stream to generate temperature. The fuel delivery mechanism may inject hydrocarbons into the exhaust stream in front of at least one catalytic component 140, 142 as shown, or the fuel injectors 135 may be configured to inject hydrocarbons into the exhaust stream by injecting into the engine 110 at a time when those hydrocarbons will not combust within the engine 110.

Some amount of the exhaust gas may be re-circulated to the engine 110, according to a proportion set by the controller 130 utilizing the EGR valve 154. In certain embodiments, the EGR cooler 122, which is operatively connected to the inlet of the intake manifold 114, cools exhaust gas in order to facilitate increased engine air inlet density. In one embodiment, an EGR bypass 152 diverts some or all of the EGR gas around the EGR cooler 122, using bypass valves (not shown) to manipulate the temperature and pressure of the gases in the intake manifold 114.

Various sensors, such as temperature sensors 124, pressure sensors 126, flow sensors on any system section (not shown) and the like, may be strategically disposed throughout the engine system 100 and may be in communication with the controller 130 to monitor operating conditions. In some cases a pressure sensor measures a value of a pressure, either gauge or absolute, and in some cases a pressure sensor is measuring a pressure differential between two system locations. In a given embodiment, when a sensor is present, the sensor may be a virtual sensor—a value for the parameter in question that is determined by the controller 130 based upon other measured parameters, and not an input from a direct physical measurement.

Engine operating conditions can be ascertained from any of the sensors or from the controller 130's commands to the engine regarding the fraction of exhaust gas recirculation, injection timing, and the like. Potential states of temperatures throughout the system can be ascertained from any of the sensors or from the controller 130's commands to the engine, combined with the current state of the engine relative to meeting the mission requirements of the engine. For example, the potential temperature of the particulate filter 150 might be a function of the temperature on each side of the particulate filter 150, the current torque required of the engine 110, and the current engine 110 speed. Potential temperatures throughout the system are important, in one embodiment, as part of a determination of whether a regeneration opportunity is available.

In one embodiment, the potential temperature of a catalytic component 140 determines whether a regeneration opportunity is present. In one embodiment, an estimate of exhaust manifold 116 temperature if a regeneration were currently being attempted, an estimate of the temperature drop across the turbocharger 118, an estimate of the temperature drop through the exhaust plumbing up to the catalytic component 140, an estimate of the thermal mass of the catalytic component 140, and knowledge of the temperature of the catalytic component 140 required to oxidize hydrocarbons from the delivery mechanism 190 are combined to determine whether a regeneration opportunity is present.

In another embodiment, an estimate of exhaust manifold 116 temperature if a regeneration were currently being attempted, an estimate of the temperature drop across the turbocharger 118, an estimate of the thermal mass of the catalytic component 140, an estimate of the delivery capabilities of the delivery mechanism 190, an estimate of the oxidation rate and related heat generation on the catalytic component 140, an estimate of the heat loss through the exhaust plumbing to the ambient environment up to the particulate filter 150, and an estimate of the thermal mass of the particulate filter 150 are combined to determine whether a regeneration opportunity is present.

These estimates are known to those of ordinary skill in the art and can be modeled in some instances or estimated from measured parameters in others. For example, the estimate of exhaust manifold temperature can be performed according to the principles of U.S. Pat. No. 6,508,242, System for estimating engine exhaust temperature, substituting potential values of engine speed, mass charge flow and fuel command parameters in place of the current values of those parameters. The intake manifold temperature is also used in that model, and a potential value could also be determined and used for that parameter, but the current value, in one embodiment, would be sufficient as that parameter is not strongly affected by system changes that typically occur during a regeneration attempt.

In one embodiment, the heat losses through the exhaust plumbing between catalytic component 140 and the particulate filter 150 can be modeled with a basic heat transfer model accounting for heat transfer to the ambient via conduction, convection, and radiation. In another embodiment, a temperature sensor is in place immediately before the final temperature of interest—either before the catalytic component 140 or the particulate filter 150, the temperature out of the turbocharger 118 is known or estimated, and the heat loss through the exhaust plumbing is estimated by assuming the temperature losses in the potential case would be proportional to the current temperature losses, the proportion being the difference in temperature between the ambient and the potential temperature divided by the difference between the ambient and the current temperature. For example, if the ambient temperature were 20 degrees C., the temperature out of the turbocharger 118 were 300 degrees C. for the current case, and 325 degrees C. for the potential case, while the final temperature of interest was the temperature into the particulate filter 150, and was 250 degrees C. for the current case, the current temperature losses would be 50 degrees C., and the potential temperature losses could be estimated as:

$$50 \ deg \ C. * \frac{(325 - 20)}{(300 - 20)} = 54 \ deg \ C..\qquad \text{Equation 1}$$

The proportionality calculated in Equation 1 could also be ignored and assumed to be 1.0, depending upon the accuracy required by the application.

Figure 2:
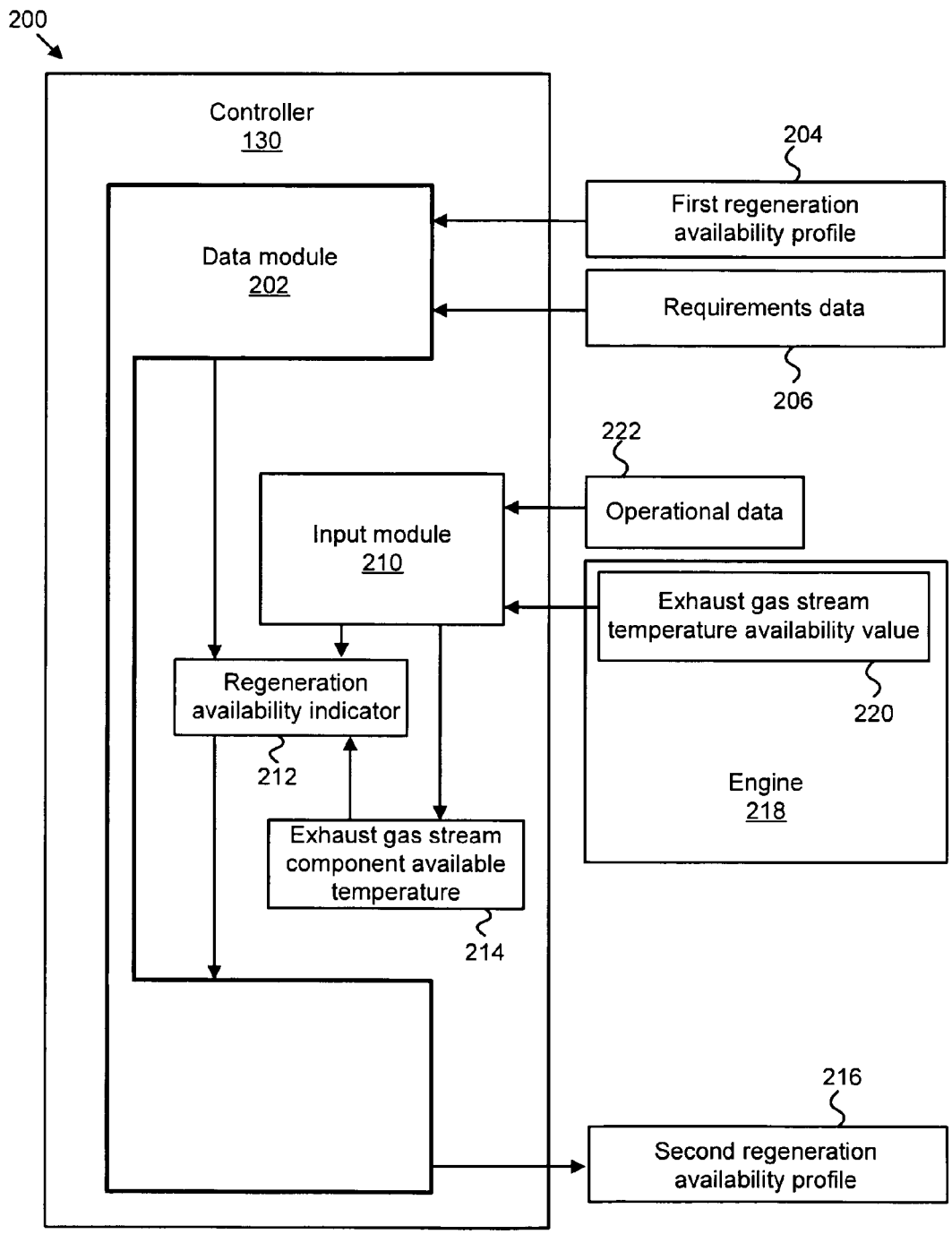
FIG. 2 is a schematic block diagram illustrating one embodiment of a control system in accordance with the present invention.

FIG. 2 shows one embodiment of an apparatus 200 to determine a regeneration availability profile according to the present invention. In one embodiment, a controller 130 comprises a data module 202 configured to receive requirements data 206 indicating the conditions required to achieve regeneration of an exhaust gas aftertreatment system component. The controller 130 further comprises an input module 210, in one embodiment, configured to receive operational data 222 indicating the conditions which could be achieved for an exhaust gas aftertreatment system component if a regeneration were attempted.

In one embodiment, the input module 210 is further configured to receive an exhaust gas stream temperature availability value 220 indicating the exhaust gas stream temperature the engine 218 could provide if a regeneration were attempted. For example, in one embodiment the requirements data 206 indicates that the particulate filter 150 must be at 400 degrees C. to achieve a regeneration, the present exhaust stream temperature into catalytic component 140 is 250 degrees C., the engine 218 indicates that the exhaust stream temperature into catalytic component 140 could be 300 degrees C. if a regeneration were attempted, and the operational data 222 indicates that the catalytic component 140 could provide 280 degrees C. to the particulate filter 150 with 250 degrees C. at the catalytic component 140 inlet, and 400 degrees C. to the particulate filter 150 with 280 degrees C. at the catalytic component 140 inlet. The example gives an exhaust gas stream component available temperature 214 of 280 degrees C. at the catalytic component 140 inlet, which is the best temperature available if a regeneration is attempted.

The current operational data 222 need not be identically the same type of parameters as the particulate filter regeneration requirements 206, but they are preferably related to the extent that the controller 130 can determine whether a regeneration opportunity is presently active. For example, in one embodiment the requirements data 206 might be a minimum temperature of 290 degrees C. at a catalytic component 140, and a minimum time of 30 seconds, while the current operational data 222 might be a current temperature of an exhaust gas stream coming into a catalytic component 140, and a current thermal mass of a catalytic component 140, which provides enough information for the controller 130 to determine whether the regeneration requirements 206 are met, and whether a regeneration opportunity is presently active.

The requirements data 206 can be virtually any type of data related to any type of exhaust gas aftertreatment system component that benefits from intermittent regeneration, or that assists some component that benefits from intermittent regeneration. For example, the component might be a particulate filter 150 that requires a minimum temperature to achieve regeneration. The component might be a NOx adsorber catalytic component 142, in one embodiment, that requires temperature, a certain low oxygen concentration, and a certain high hydrocarbon concentration to regenerate. The component might be a diesel oxidation catalytic component 140, where the component requires a minimum inlet temperature to oxidize hydrocarbons and achieve a minimum outlet temperature to support the regeneration of some other component.

The controller 130 comprises, in one embodiment, the data module 202, which is further configured to read a first regeneration availability profile 204. The controller 130, in one embodiment, is configured to use information from the data module 202, the input module 210, and the exhaust gas stream component available temperature 214 to determine a regeneration availability indicator 212. The controller 130 is further configured, in one embodiment, to make changes to the profile based upon the regeneration availability indicator 212 and to provide the updated profile to the data module 202. The data module 202 is further configured, in one embodiment, to store a second regeneration availability profile 216. In one embodiment, the second regeneration availability profile 216 of a given controller 130 execution cycle becomes the first regeneration availability profile 204 for the next controller 130 execution cycle.

Figure 3:
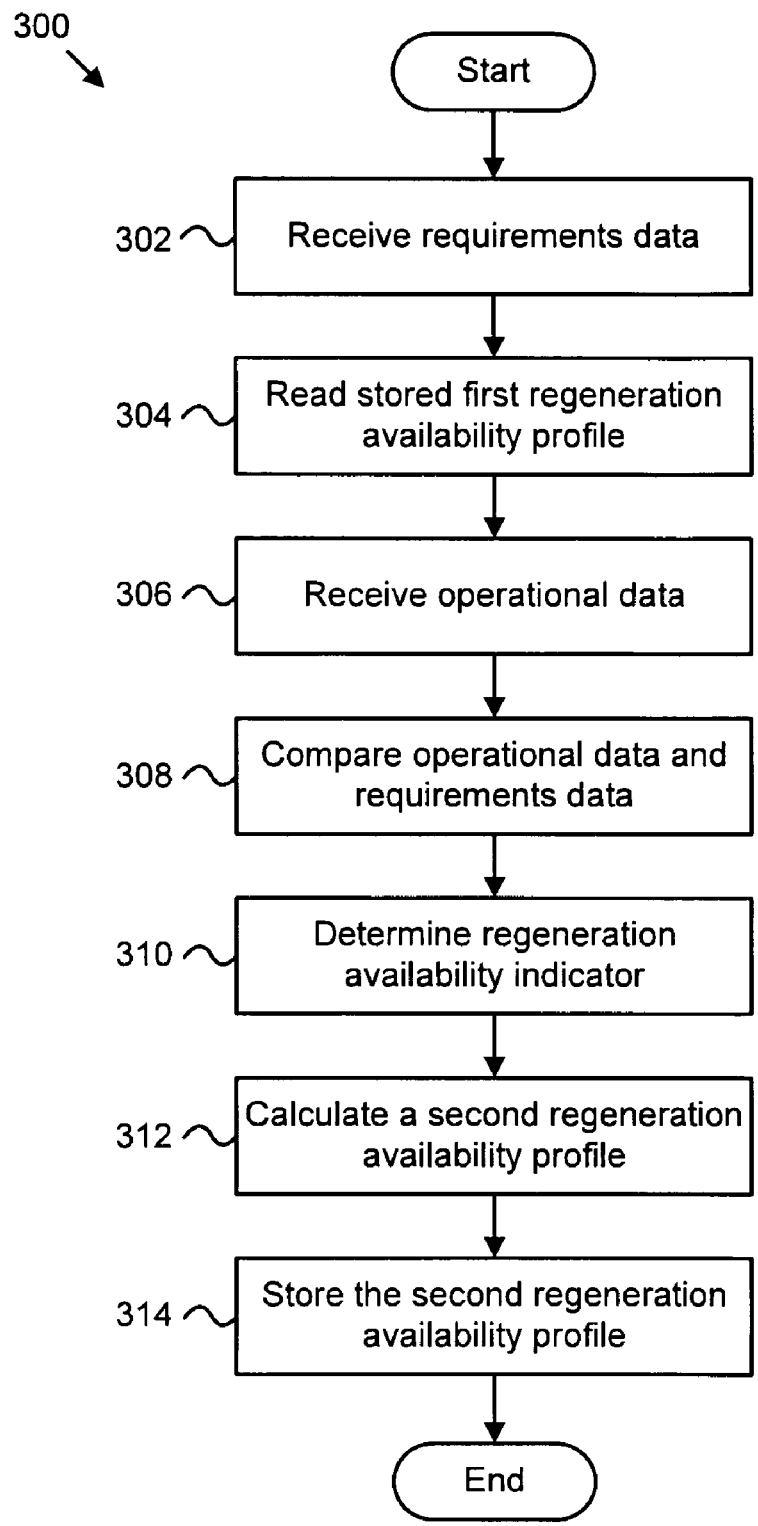
FIG. 3 is a schematic flow chart diagram illustrating one embodiment of a regeneration availability profile determination method of the present invention.

FIG. 3 shows a method 300 for generating a regeneration availability profile in accordance with the present invention. In one embodiment, the method 300 begins with receiving 302 requirements data relative to the desired regeneration conditions of an exhaust gas aftertreatment system. The method 300 also reads 304 a stored first regeneration availability profile. In one embodiment, the method 300 is iterative, and there may be no information stored as a regeneration profile in an early iteration of the method 300. The method 300 in that case can proceed, using a blank profile as the first regeneration availability profile. In another embodiment, the method runs on a computing device with a memory storage system (not shown), and a desired regeneration availability profile is pre-loaded at the time of manufacture of the computing device and memory storage system. The pre-loaded regeneration availability profile, in one embodiment, is consistent with an application that does not provide many regeneration opportunities to provide for better protection of the exhaust gas aftertreatment system until the method 300 has enough iterations to learn the true regeneration availability profile of the exhaust gas aftertreatment system.

The method 300 receives 306 operational data related to the current operating conditions of the exhaust gas aftertreatment system, in one embodiment. The method 300 may then compare 308 the operational data with the requirements data to determine 310 whether a regeneration availability indicator should be set. In one embodiment, the regeneration availability indicator is set to TRUE when the exhaust gas aftertreatment system is able to regenerate if attempted, and the regeneration availability indicator is set to FALSE when the exhaust gas aftertreatment system is not able to regenerate if attempted.

The method 300 then calculates 312 a second regeneration availability profile, in one embodiment, based upon the regeneration availability indicator and the first regeneration availability profile. The method 300 may then store 314 the second regeneration availability profile. In one embodiment, the method 300 is iterative, and the stored second regeneration availability profile for one execution cycle becomes the stored first regeneration availability profile for a subsequent execution cycle.

In one embodiment, receiving 302 requirements data comprises receiving a desired temperature for a component within the exhaust aftertreatment to accomplish a regeneration, and receiving 306 operational data comprises receiving an achievable for the component within the exhaust aftertreatment system. In one embodiment, receiving the requirements data comprises receiving a required temperature at an engine outlet. In another embodiment, receiving the requirements data comprises receiving a required temperature at the exhaust gas aftertreatment system inlet.

In one embodiment, receiving 302 requirements data comprises an availability of an engine operating mode, and the operational data comprises a list of available engine operating modes. For example, it may be required to use the fuel injectors 135 to regenerate in a manner that might sometimes interfere with the basic function of the engine 110, so a component of the regeneration availability determination would include determining whether the engine 110 can support a regeneration effort.

FIG. 4 presents a table illustrating one embodiment of a regeneration availability profile in accordance with the present invention. FIG. 4 shows a series of operating period data, the operating period data comprising a series of regeneration opportunity tally values. In one embodiment, each opportunity tally value is associated with a length of time value, and is contained within an operating period data set. For example, in the illustration shown for FIG. 4, the regeneration opportunity tally value "V42" is associated with the 170 second length of time value, and is contained within the operating period data associated with operating period 1.

In one embodiment, the regeneration opportunity tally values represent the number of times within the relevant operating period that the regeneration opportunity indicator has consecutively indicated a regeneration opportunity that lasted for at least the amount of time equal to the length of time value. For example, in one embodiment, if the relevant operating period is operating period 2, and the regeneration opportunity indicator becomes TRUE for 12 seconds, and then becomes FALSE, the controller 130 will increment the regeneration opportunity tally value "V12" by one. In one way of describing the event, the controller 130 recognized that a regeneration opportunity of at least 8 seconds occurred within operating period 2.

In a preferred embodiment, the series of time values in the length of time value column increase approximately exponentially. In the illustration shown for FIG. 4, each succeeding length of time value is approximately three times the size of the preceding length of time bucket. In one embodiment, the longest length of time value is taken as a time significant to the system—perhaps the longest relevant time required to completely regenerate the exhaust gas aftertreatment system component, and the shortest bucket is selected to be the shortest relevant time that may show more regeneration opportunity than a mere transient event would cause—like a temperature spike during a gear shift, for example. This selection of time values allows the regeneration availability profile to display a full range of regeneration time values while allowing the total data storage for the profile to be minimized. In other embodiments where data storage is not at a premium, or greater resolution is required, the length of time values selections could be more linear. Likewise, a given embodiment may have specific relevant times of interest that could be added into the profile.

Figure 5:
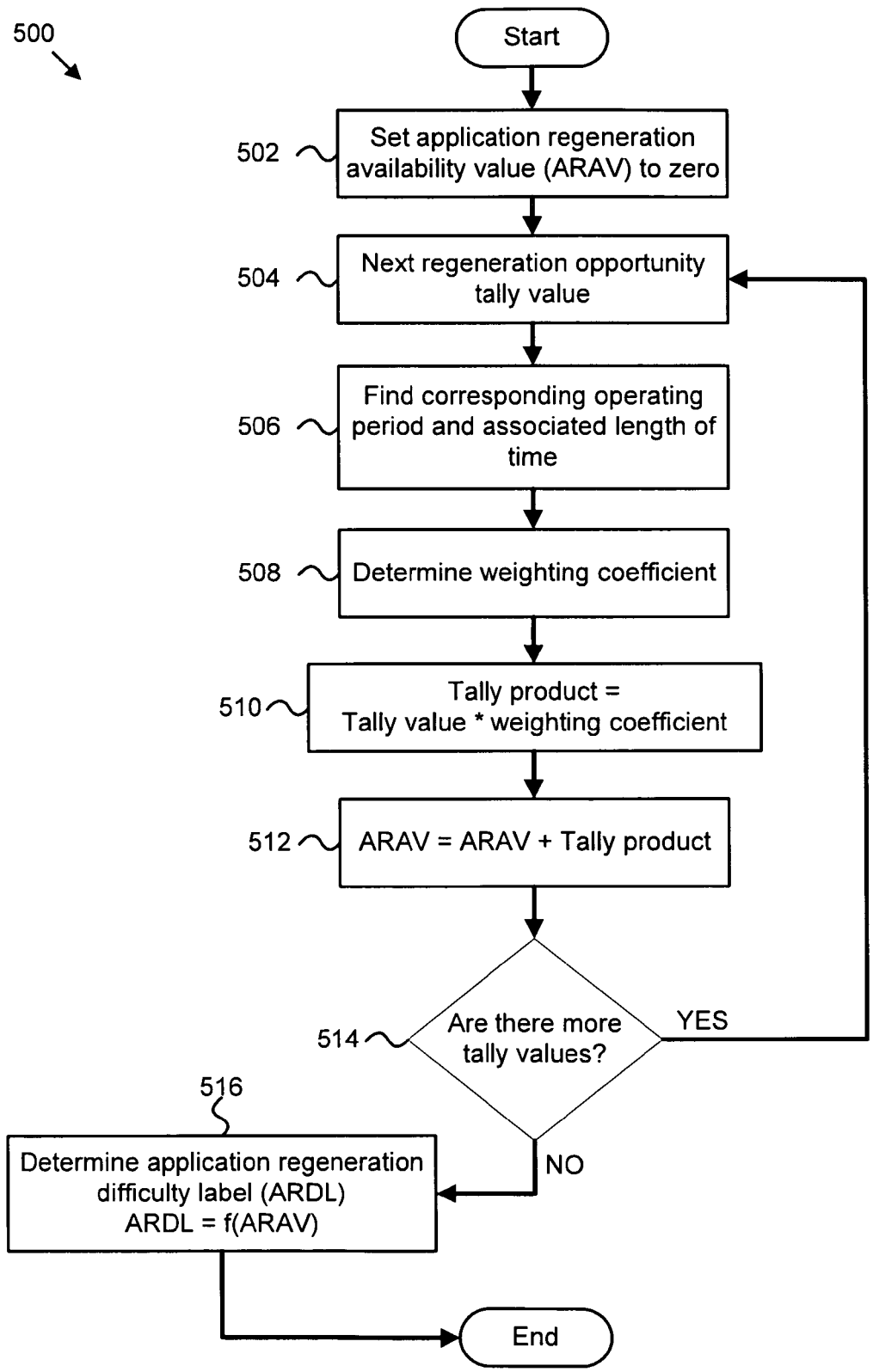
FIG. 5 is a schematic flow chart diagram illustrating one embodiment of a method to calculate a regeneration availability value in accordance with the present invention.

FIG. 5 shows a method for calculating an application regeneration availability value (ARAV) in accordance with the present invention. In one embodiment, the ARAV is included in the regeneration availability profile and is calculated from other parts of the regeneration availability profile. The method starts at 502 where the ARAV is reset to zero. The method selects 504 the next regeneration opportunity tally value, which at the beginning of the method is simply the first regeneration opportunity tally value in the regeneration availability profile. The method then finds 506 the corresponding operating period and associated length of time, with the selected tally value, and determines 508 a weighting coefficient based on the operating period and length of time. The weighting coefficient is determined according to the priority that should be given to the corresponding operating period and associated length of time value. In one embodiment, the more recent operating periods are given more weight than more distant operating periods, and the higher length of time values are given more weight than the lower length of time values, according to the following formula:

$$WC = \sum_{k=1}^{t} \sum_{i=1}^{n} \left( \frac{OP_i}{Q^{i-1}} \times f(LTV_k) \right).$$ Equation 2

WC is the weighting coefficient. In equation 2, t represents the number of length of time values in each operating period—for the example embodiment of FIG. 4 t equals 6. n represents the total number of operating periods, in order from most recent=1 to furthest in the past=n, to be used in the calculation of the weighting coefficient, and therefore in the calculation of the ARAV—for the example embodiment of FIG. 4, n equals 4. $OP_i$ and $LTV_k$ represent the operating period and length of time value for which the weighting coefficient is to be determined.

In equation 2, $f(LTV_k)$ is a function of the length of time value. This function is very dependent upon the specific application and must be derived experimentally, but it should be proportional to the amount of regeneration that can actually occur during a regeneration equal to the length of time value. For example, if the in the underlying application represented by FIG. 4 does not experience any regeneration for 30 seconds after an opportunity is present, then experiences regeneration proportionally to the amount of time that the regeneration opportunity stays active thereafter, then the 6 numbers of $f(LTV_k)$ for the values 8, 20, 60, 170, 500 and 1500 should be proportional to 0, 0, 30, 140, 470 and 1470 respectively.

Since the units on the Regeneration Opportunity Value are arbitrary, the function values 0, 0, 3, 14, 47 and 147 are the same.

Q is a selected value that is a design choice on how strongly the method should react to recent information. One skilled in the art will recognize that a Q of 1.0 in equation 2 will treat all operating periods the same, a Q below 1.0 will cause more distant operating periods to affect the ARAV more strongly than more recent ones, and a Q greater than 1.0 will cause more recent operating period information to more strongly affect the ARAV. Since it is an object of the invention to react to changes in the operation of an application, in embodiments that use equation 2 to define the weighting coefficients, Q values should be equal to or greater than 1.0 and preferably in the range of about 1.0-3.0.

Many other methods of weighting the importance of particular regeneration occurrences are within the ordinary skill of one in the art. The important concept is that the weighting coefficient is the tool for implementing the selected priorities of the application. The weighting coefficients should be set to favor recent operating periods if quick response time is desired, and set to level out the operating periods if stability of operation is desired. The length of time effect on the weighting coefficients should reflect how much regeneration is accomplished within the length of time value, and in many embodiments this will mean that several of the length of time values will have an associated weighting coefficient of zero.

The method 500 proceeds to determine a tally product by multiplying 510 the appropriate tally value by the determined 508 weighting coefficient. Once the tally product is determined 510 for the particular tally value, the method 500 checks 514 if there are more tally values to consider. If there are more tally values to consider, the method 500 proceeds to 504 to consider the next tally value. If there are no more tally values to consider, the method proceeds, in one embodiment, to determine 516 an application regeneration difficulty label (ARDL) from the ARAV.

In one embodiment, the ARDL is a small integer value determined from various thresholds of the ARAV, preferably in the range of about 1-10. Any number of other schemes for the ARDL are within the scope of the invention, but a continuously varying representation of the regeneration opportunities already exists in the ARAV, therefore the categorization provided by small integer values of the ARDL is beneficial. In a preferred embodiment, a lower ARAV will generate an ARDL indicating a less favorable regeneration availability, while a higher ARAV will generate an ARDL indicating a more favorable regeneration availability. The label is useful, in one embodiment, as a control flag within the controller 130 to enable discrete decision making, and is further useful for display purposes to an operator or engineer.

FIG. 6 presents a table illustrating one embodiment of a regeneration availability profile, and one embodiment of the calculation of a regeneration opportunity value in accordance with the present invention. FIG. 6 shows a series of operating period data (OP), the operating period data comprising a series of regeneration opportunity tally values, a series of weighting coefficients, and a series of tally products. In one embodiment, equation 2 is used to calculate the weighting coefficients, with Q=1.5, n=4, t=6, and f(LTV)=0, 0, 3, 14, 47, and 147. The table in FIG. 6 shows a series of tally products, where each tally product is the appropriate regeneration opportunity tally value multiplied by the associate weighting coefficient. The regeneration opportunity value is shown, and is equal to the sum of the tally products.

Figure 7:
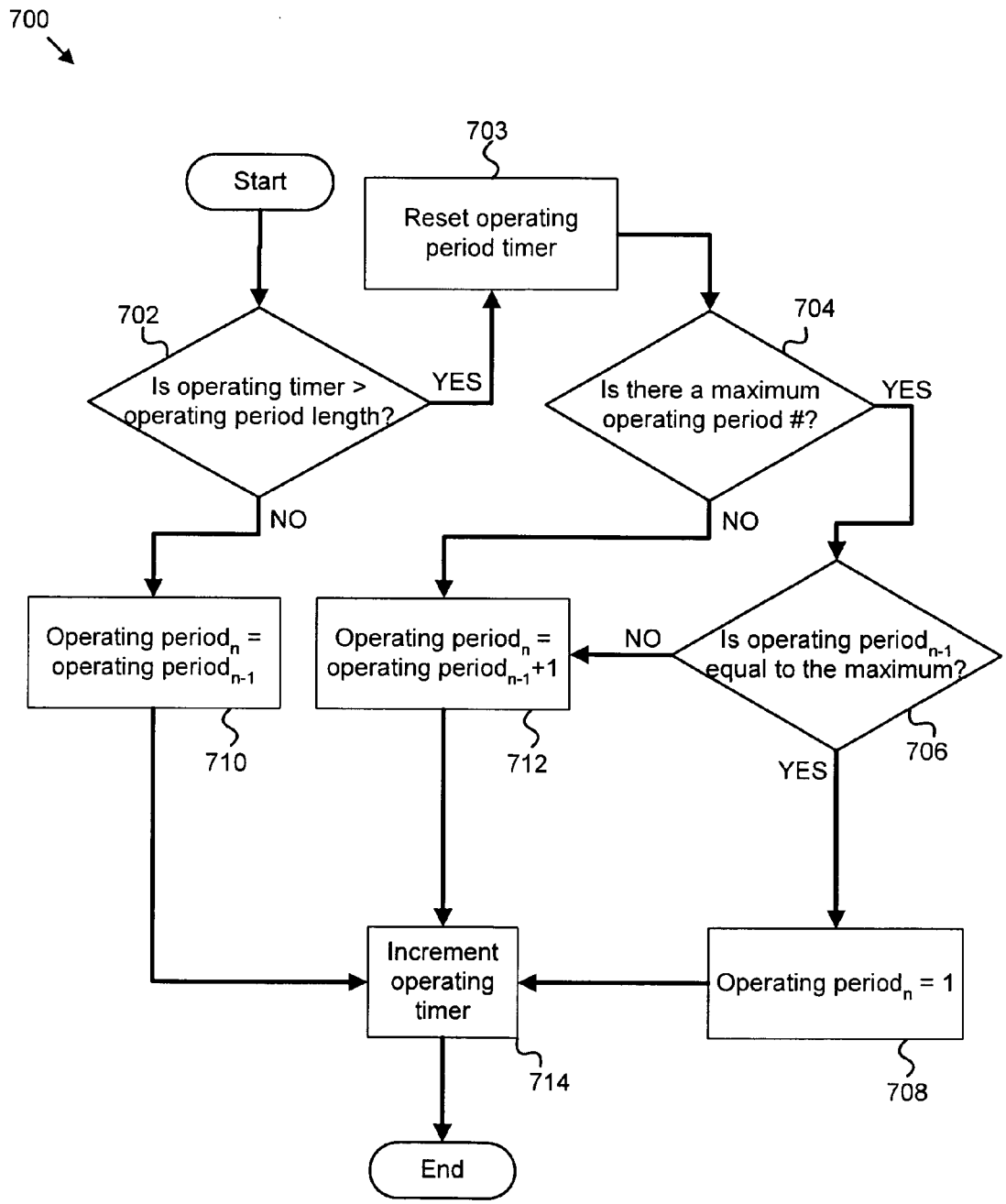
FIG. 7 is a schematic flowchart diagram illustrating one embodiment of tracking and incrementing an operating period number for use in storing a rolling buffer of operating period information in accordance with the present invention.

FIG. 7 shows a method 700 of tracking a current operating period number. The operating period number generated by the method 700 is appropriate for use storing operating period data in a rolling buffer or in a continuous chain of operation period data. A rolling buffer would involve storing operating period data from a number of operating periods and replacing the oldest data from the buffer with newer data. A continuous chain of operation period data would contain the most information and be most useful for implementing the concepts of the invention, but data storage limits increase as the number of stored operating periods goes up, and in many embodiments the utility of old data diminishes as the regeneration opportunity value is often less affected by old data. Therefore, in many embodiments, a rolling buffer storing between 2 and 30 operating period data sets is preferable. In some applications, for example where maximum utility of the regeneration availability profile is desired, and storage costs are not an issue, a continuous chain of operating period data for the life of the exhaust gas aftertreatment system may be desirable.

The method 700 begins with checking 702 if an operating period timer has exceeded the operating period length. In one embodiment, the operating period timer increments how long the exhaust gas aftertreatment system has been operating, and the timer value is paused but not reset when the exhaust gas aftertreatment system is not operating. The desired length is preferably selected with the desired response time for a change in the regeneration availability profile. For example, if the regeneration availability profile should define the regeneration opportunities available in an exhaust gas aftertreatment system within 40 hours of operation, and the number of operating period data sets to be used in the regeneration availability profile is four, then the desired operating period length should be 10 hours. In one embodiment, the operating period length is selected according to the number of hours that applicable regulations allow drivers to operate a vehicle for which the exhaust gas aftertreatment system was designed to serve—11 hours, in one instance.

If the operating period timer does not exceed the operating period length, the current operating period number remains 710 the same as the previous operating period number, the method 700 increments 714 the operating period timer and ends. if the operating period timer exceeds the operating period length, the method 700 resets 703 the operating period timer to zero, and checks 704 if there is a maximum operating period number. In an embodiment where a rolling data buffer is desired, there will be a maximum operating period number equal to the number of operating period data sets that should be in the buffer. If there is no maximum operating period number, the method 700 increments 712 the operating period number, increments 714 the operating period timer and ends.

If there is a maximum operating period number, the method 700 checks 706 whether the previous operating period number was equal to the maximum operating period number. If the previous operating period number was not equal to the maximum operating period number, the method 700 increments 712 the operating period number, increments 714 the operating period timer and ends. If the previous operating period number was equal to the maximum operating period number, the method 700 resets 708 the operating period number to the lowest value. In one embodiment, the lowest operating period number is 1.

Figure 8:
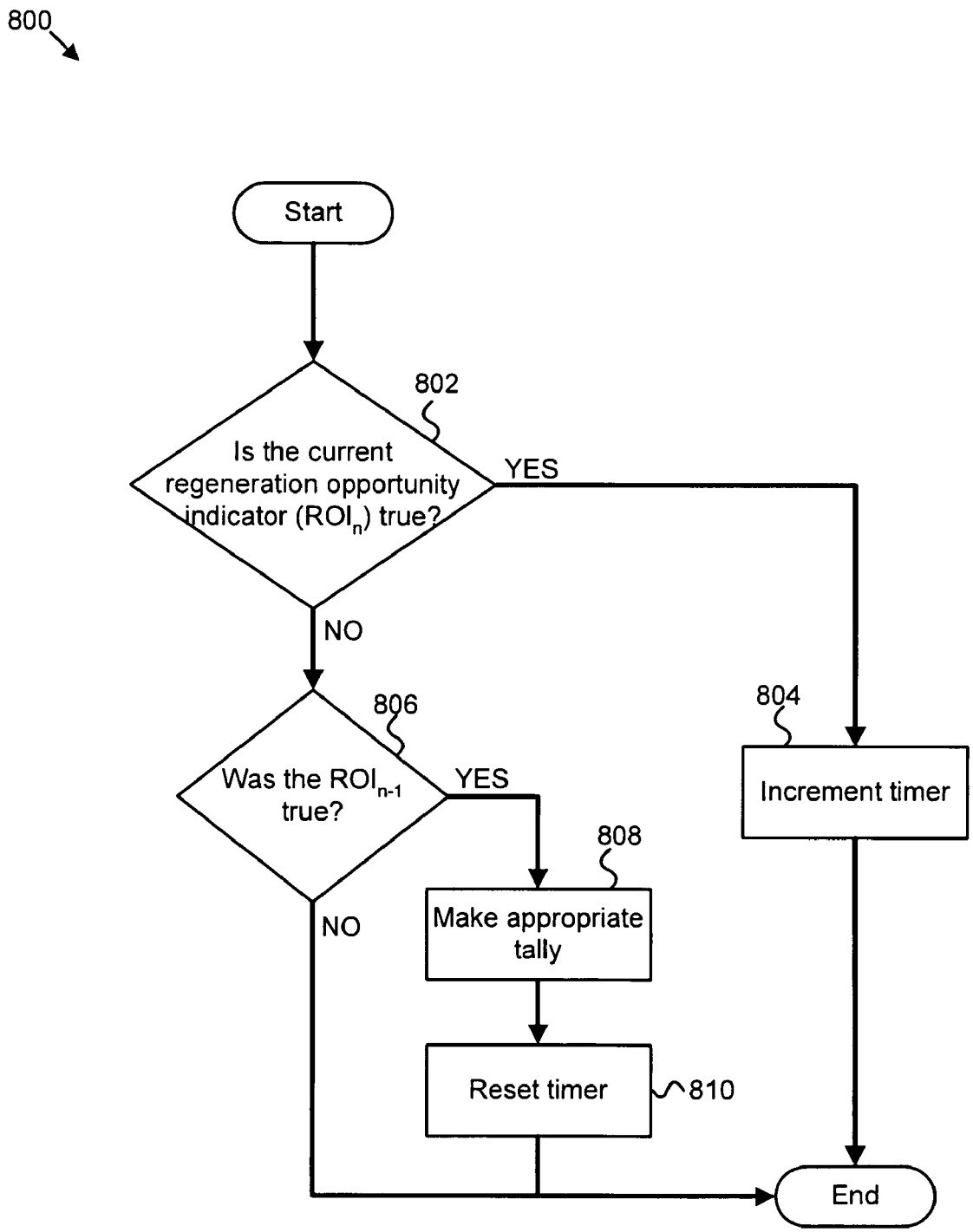
FIG. 8 is a schematic flow chart diagram illustrating one embodiment of a method to determine when a regeneration opportunity value has consecutively indicated a regeneration opportunity in accordance with the present invention.

FIG. 8 shows a method 800 of counting the number of times, within an operating period, where the regeneration opportunity indicator has consecutively indicated a regeneration opportunity for at least as long as the length of time value associated with the appropriate tally value, in accordance with the present invention. The method begins, in one embodiment, with checking 802 whether the regeneration opportunity indicator is currently TRUE. If the regeneration opportunity indicator is currently TRUE, the method 800 may increment 804 the current regeneration opportunity event timer and end. If the regeneration opportunity indicator is FALSE, the method may check 806 whether the regeneration opportunity indicator was true during the last execution cycle of the method 800. If the regeneration opportunity indicator was not TRUE during the last execution cycle of the method 800, the method may end. In one embodiment, if the regeneration opportunity indicator was TRUE during the last execution cycle of the method 800, then the current regeneration opportunity event has ended, and the method 800 makes increments the appropriate regeneration opportunity tally value.

In one embodiment, the appropriate regeneration opportunity tally value is the tally value associated with both the current operating period, and with the longest length of time value that does not exceed the current regeneration event timer. For example, if the current operating period was 2, the current regeneration opportunity event timer was 705 seconds, and the regeneration opportunity profile of FIG. 4 were used, the appropriate tally value to increment would be "V52". If the current regeneration opportunity event timer were instead 6 seconds, then, in one embodiment, there is no tally value incremented for that regeneration opportunity. The method proceeds, in one embodiment, to reset 810 the current regeneration opportunity event timer after making 808 the appropriate tally.

It will be apparent to one skilled in the art that, in one embodiment, the operating period timer could indicate a new operating period while a current regeneration opportunity event is active which could create ambiguity as to where within the regeneration opportunity profile to tally the regeneration opportunity event. There are a number of ways to manage this situation, and all are within the ordinary skill of one in the art.

The best mode of managing this situation is presented for clarification. If an embodiment uses the current regeneration event timer, an operating period timer, and a regeneration availability indicator, and the operating period timer expires during while the regeneration availability indicator is TRUE, the current operating period should be extended beyond the operating period length, and the current regeneration opportunity event timer should be allowed to run. When the regeneration availability indicator switches to FALSE, the current regeneration event timer should be reset, the regeneration opportunity should be appropriately tallied, and the operating period should be incremented.

The reason this is typically the best behavior is because regeneration opportunities are typically relatively uncommon, and splitting a single event across two operating periods might distort the occurrence and make it look smaller than it was. Further the operating period is typically long, and extending it a bit to accommodate the completion of a particular regeneration opportunity will typically not distort the data significantly. Finally, some of the slightly more correct behaviors—like calculating which operating period the bulk of the regeneration opportunity belongs within or giving a partial tally to two different operating periods—involve an algorithmic overhead that is typically not worth the cost. However, in some embodiments, the typical characteristics will not be true, and other behaviors for this occurrence would then be the better behaviors. All of these behaviors are contemplated within the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus configured to calculate a regeneration availability profile of an exhaust gas aftertreatment system, the apparatus comprising:
   a data module configured to read a stored first regeneration availability profile, and further configured to receive requirements data relative to desired regeneration conditions of the exhaust gas aftertreatment system;
   an input module to receive operational data relative to current operating conditions of the exhaust gas aftertreatment system; and
   a controller configured to determine a regeneration availability indicator by comparing the operational data to the requirements data, the controller further configured to calculate a second regeneration availability profile based upon the regeneration availability indicator and the first regeneration availability profile;
   wherein the data module is further configured to store the second regeneration availability profile, and
   wherein each regeneration availability profile comprises a series of operating period data corresponding to a series of operating periods of the exhaust gas aftertreatment system.

2. The apparatus of claim 1, wherein an engine is coupled to the exhaust gas aftertreatment system, wherein the input module is further configured to receive an exhaust gas stream temperature availability value from the engine, and wherein the controller is further configured to calculate the available temperature of an exhaust gas aftertreatment system component based upon the exhaust gas stream temperature availability value from the engine.

3. The apparatus of claim 1, wherein the exhaust gas aftertreatment system comprises a particulate filter, and wherein the requirements data comprises a minimum temperature required to regenerate the particulate filter.

4. The apparatus of claim 1, wherein the exhaust gas aftertreatment system comprises a $NO_x$ adsorber catalytic component, and wherein the requirements data comprises a minimum temperature, an oxygen fraction of an exhaust gas stream, and a hydrocarbon fraction of the exhaust gas stream required to regenerate the $NO_x$ adsorber catalytic component.

5. The apparatus of claim 1, wherein the exhaust gas aftertreatment system comprises a hydrocarbon generator configured to inject hydrocarbons into an exhaust gas stream, and a diesel oxidation catalytic component configured to oxidize hydrocarbons in the exhaust gas stream, wherein the requirements data comprises a minimum temperature to oxidize hydrocarbons on the diesel oxidation catalytic component.

6. A method for calculating a regeneration availability profile of an exhaust gas aftertreatment system, the method comprising:
   receiving requirements data relative to desired regeneration conditions of the exhaust gas aftertreatment system;
   reading a stored first regeneration availability profile;
   receiving operational data relative to current operating conditions of the exhaust gas aftertreatment system;
   determining a regeneration availability indicator by comparing the operational data to the requirements data, and calculating a second regeneration availability profile based upon the regeneration availability indicator and the first regeneration availability profile; and
   storing the second regeneration availability profile;
   wherein each regeneration availability profile comprises a series of operating period data corresponding to a series of operating periods.

7. The method of claim 6, wherein the exhaust aftertreatment system is coupled to an engine, wherein the requirements data comprises an availability of an engine regeneration operating mode, wherein the operational data comprises one or more currently available engine operating modes, and wherein determining a regeneration availability indicator comprises determining whether the engine regeneration operating mode is present on the one or more currently available engine operating modes.

8. The method of claim 6, wherein the operational data comprises the currently achievable temperature of an exhaust aftertreatment system component, wherein the requirements data comprises a desired temperature to perform an exhaust aftertreatment system regeneration, and wherein determining the regeneration availability indicator comprises determining whether the achievable temperature is greater than the desired temperature.

9. The method of claim 8, wherein receiving the desired temperature to perform an exhaust aftertreatment system regeneration comprises receiving a desired temperature for at least one member selected from the group comprising a temperature at an engine outlet wherein the engine is coupled to the exhaust aftertreatment system, a temperature at the exhaust gas aftertreatment system inlet, and a temperature of a component within the exhaust gas aftertreatment system.

10. The method of claim 6, wherein each operating period data comprises a series of regeneration event opportunity tally values, wherein each regeneration event opportunity tally value is associated with a length of time value, and wherein each regeneration event opportunity tally value represents the number of times, within the operating period, where the regeneration opportunity indicator has consecutively indicated a regeneration opportunity for at least as long as the associated length of time value.

11. The method of claim 10, wherein the length of time values comprise a series of time values, wherein the values increase approximately exponentially from the first time value to the last time value in the series.

12. The method of claim 10, further comprising calculating an application regeneration availability value by determining a weighting coefficient associated with each of the regeneration opportunity tally values, wherein each weighting coefficient is based upon the corresponding operating period and the associated length of time value, by multiplying each of the of regeneration opportunity tally values by the associated weighting coefficient to determine a plurality of tally products, and adding together the tally products.

13. The method of claim 12, further comprising calculating an application regeneration difficulty label based upon the application regeneration availability value, and reporting the application regeneration difficulty label.

14. The method of claim 13, wherein the application regeneration difficulty label comprises a small integer number, between about 1 and 10.

15. The method of claim 10, wherein each operating period comprises a predefined time of exhaust aftertreatment system operation.

16. The method of claim 15, wherein the predefined time of exhaust aftertreatment system operation comprises a number of hours equal to a regulatory driving time applicable to an intended operator of an application coupled with the exhaust aftertreatment system.

17. The method of claim 10, the method further comprising tracking the current operating period, incrementing the current operating period at the end of each predefined time, and storing the current operating period data in a rolling buffer.

18. The method of claim 17, wherein the rolling buffer comprises between about 2 and 30 operating periods.

19. A computer readable medium tangibly embodying a program of machine-readable instructions executable by a digital processing apparatus to perform an operation to calculate a regeneration availability profile of an exhaust gas aftertreatment system, the operation comprising:

receiving requirements data relative to desired regeneration conditions of the exhaust gas aftertreatment system;

reading a stored first regeneration availability profile;

receiving operational data relative to current operating conditions of the exhaust gas aftertreatment system;

determining a regeneration availability indicator by comparing the operational data to the requirements data, and calculating a second regeneration availability profile based upon the regeneration availability indicator and the first regeneration availability profile; and storing the second regeneration availability profile;

wherein each regeneration availability profile comprises a series of operating period data corresponding to a series of operating periods, and wherein each operating period data comprises a regeneration event opportunity value associated with a length of time value.

20. The computer readable medium of claim 19, wherein each operating period data comprises a series of regeneration event opportunity tally values, and wherein each regeneration event opportunity tally value represents the number of times, within the operating period, where the regeneration opportunity indicator has consecutively indicated a regeneration opportunity for at least as long as the associated length of time value.

21. The computer readable medium of claim 19, the operation further comprising calculating an application regeneration difficulty label based upon the second regeneration availability profile, and reporting the application regeneration difficulty label.

22. The computer readable medium of claim 19, wherein the operational data comprises the currently achievable temperature of an exhaust aftertreatment system component, wherein the requirements data comprises a desired temperature to perform an exhaust aftertreatment system regeneration, and wherein determining the regeneration availability indicator comprises determining whether the achievable temperature is greater than the desired temperature.

23. The computer readable medium of claim 22, the operation further comprising calculating an application regeneration availability value by determining a weighting coefficient associated with each of the regeneration opportunity tally values, wherein each weighting coefficient is based upon the corresponding operating period and the associated length of time value, by multiplying each of the of regeneration opportunity tally values by the associated weighting coefficient to determine a plurality of tally products, and adding together the tally products.

24. An exhaust gas aftertreatment system for calculating a regeneration availability profile, the system comprising:

an exhaust gas aftertreatment component requiring intermittent regeneration, wherein achieving the regeneration requires certain system conditions;

a detector configured to detect conditions of the exhaust gas aftertreatment component relative to the certain system conditions, and to report the detection as a current operating condition;

a controller configured to receive the current operating condition, to compare the current operating condition with the certain system conditions, to calculate a regeneration availability profile based on the comparison over time, and to report the regeneration availability profile;

wherein the regeneration availability profile is based at least partially on an operating period of the aftertreatment system and comprises a plurality of regeneration event opportunity tally values each representing the number of times a regeneration opportunity has lasted for at least an amount of time equal to a respective one of a plurality of length of time values within the operating period.

25. The system of claim 24, further comprising an internal combustion engine that produces exhaust gas as a byproduct of operation.

* * * * *